United States Patent [19]

Nikas et al.

[11] Patent Number: 5,463,382

[45] Date of Patent: Oct. 31, 1995

[54] METHOD AND APPARATUS FOR CONTROLLING MESSAGE TRANSMISSIONS IN AN ACKNOWLEDGE-BACK SELECTIVE CALL COMMUNICATION SYSTEM

[75] Inventors: Dimitrios Nikas, Boynton Beach; Zaffer S. Merchant, Lantana, both of Fla.

[73] Assignee: Motorola, Inc., Schaumburg, Ill.

[21] Appl. No.: 231,594

[22] Filed: Apr. 22, 1994

[51] Int. Cl.⁶ .................................................. H04Q 7/00
[52] U.S. Cl. .............................. 340/825.44; 340/825.47; 340/825.54; 370/61; 455/38.1
[58] Field of Search ....................... 340/825.44, 825.47, 340/825.54, 825.07, 311.1; 379/57, 59, 63; 370/61, 82, 94.1, 92; 455/38.1, 38.4

[56] References Cited

U.S. PATENT DOCUMENTS

| | | | |
|---|---|---|---|
| 4,247,908 | 1/1981 | Lockhart, Jr. et al. | 364/900 |
| 4,851,829 | 7/1989 | De Luca et al. | 340/825.44 |
| 4,868,560 | 9/1989 | Oliwa et al. | 340/825.44 |
| 4,875,038 | 10/1989 | Siwiak et al. | 340/825.44 |
| 4,928,096 | 5/1990 | Leonardo et al. | 340/825.44 |
| 5,142,279 | 8/1992 | Jasinski et al. | 340/825.44 |
| 5,153,582 | 10/1992 | Davis | 340/825.44 |
| 5,193,090 | 3/1993 | Filipiak et al. | 370/61 |

*Primary Examiner*—Donald J. Yusko
*Assistant Examiner*—Edward Merz
*Attorney, Agent, or Firm*—R. Louis Breeden

[57] ABSTRACT

A method and apparatus control message transmissions in an acknowledge-back selective call communication system (100) including an infrastructure (102) and a selective call receiver (120). The selective call receiver (120) stores received messages in a memory (322). The infrastructure (102) transmits (604) to the selective call receiver (120) information including the length (408) of a pending message, and the selective call receiver (120) determines (606) therefrom a response (412, 504) based upon the length (408) of the pending message and memory space available in the memory (322). The selective call receiver (120) transmits (608) the response (412, 504) to the infrastructure (102), and the infrastructure (102) controls further processing of the pending message in accordance with the response (412, 504).

14 Claims, 8 Drawing Sheets

600

710

METHOD AND APPARATUS FOR CONTROLLING MESSAGE TRANSMISSIONS IN AN ACKNOWLEDGE-BACK SELECTIVE CALL COMMUNICATION SYSTEM

FIELD OF THE INVENTION

This invention relates in general to selective call communication systems, and more specifically to a method and apparatus for controlling message transmissions in an acknowledge-back selective call communication system.

BACKGROUND OF THE INVENTION

Communication systems utilizing selective call receivers having a memory within for storing selective call messages received from callers are well known in the art. Such receivers allow a user to see or hear a received message at a time later than the exact moment of message transmission. Typically, the stored messages are retained until they are manually erased by the user, or are automatically erased by the receiver when additional memory space is needed for a new incoming message.

Some selective call receivers allow the user to "lock" selected messages, such that the locked messages will not be automatically erased by a new incoming message. A problem that can occur when a user locks a plurality of received messages is that there may be insufficient memory space available in the receiver for storing a new incoming message, resulting in loss of one or more new messages. In addition, the user sending the message often is unaware that the problem is occurring, and thus does not take steps to correct the problem. The problem is of course more likely to happen when the new message is a relatively lengthy one.

Thus, what is needed is a method and apparatus for providing a solution to the aforementioned problem. A method and apparatus is needed that can control the loss of new incoming messages when there is insufficient memory available in the selective call receiver for storing the new messages. A method and apparatus that can bring the problem to the attention of the user for possible correction is also needed.

SUMMARY OF THE INVENTION

An aspect of the present invention is a method of controlling message transmissions in an acknowledge-back selective call communication system comprising an infrastructure and a selective call receiver that receives a plurality of messages transmitted from the infrastructure. The plurality of messages have a length that is variable, and the selective call receiver stores the plurality of messages in a memory. The method comprises the steps of transmitting information from the infrastructure to the selective call receiver, the information comprising the length of a pending message, and determining therefrom by the selective call receiver a response based upon the length of the pending message and memory space available in the memory for storing the pending message. The determining step comprises the steps of comparing the memory space available with the length of the pending message to determine whether sufficient memory space is available to store the pending message, and making the response a request to send the pending message, in response to sufficient memory space being available. The determining step further comprises the step of making the response a request to delay the pending message, in response to insufficient memory space being available. The method further comprises the steps of transmitting the response from the selective call receiver to the infrastructure, and controlling further processing of the pending message by the infrastructure in accordance with the response.

Another aspect of the present invention is a method of controlling message transmissions in an acknowledge-back selective call communication system comprising an infrastructure and a selective call receiver that receives a plurality of messages transmitted from the infrastructure. The selective call receiver stores the plurality of messages in a memory. The method comprises the steps of determining by the selective call receiver that insufficient space is available in the memory for storing any additional messages, and transmitting in response an unsolicited notice from the selective call receiver to the infrastructure, the notice indicating that the memory is full. The method further comprises the step of storing, by the infrastructure in response to the unsolicited notice, an additional message intended for the selective call receiver.

Another aspect of the present invention is an acknowledge-back selective call communication system that performs message transmission control. The system comprises an infrastructure that transmits a plurality of messages having a length that is variable, and a selective call receiver coupled to the infrastructure for receiving and storing selected ones of the plurality of messages. The infrastructure comprises a controller for controlling the infrastructure to process a pending message originated by a source, the controller comprising an input element coupled to the source for receiving the pending message, and a message transmitter coupled to the controller for transmitting information to the selective call receiver, the information comprising the length of the pending message. The selective call receiver comprises a message receiver coupled to the message transmitter for receiving the information and the selected ones of the plurality of messages, and a memory coupled to the message receiver for storing the selected ones of the plurality of messages. The selective call receiver further comprises a processor coupled to the memory for controlling the selective call receiver, and a selective call address element coupled to the processor for selecting messages and information intended for the selective call receiver. The selective call receiver further comprises a determination element coupled to the processor for determining from the information a response based upon the length of the pending message and memory space available in the memory for storing the pending message. The determination element comprises a comparator element for comparing the memory space available with the length of the pending message to determine whether sufficient memory space is available to store the pending message, and a first responder element coupled to the comparator element for making the response a request to send the pending message, in response to sufficient memory space being available. The determination element further comprises a second responder element coupled to the comparator element for making the response a request to delay the pending message, in response to insufficient memory space being available. The selective call receiver further comprises an acknowledge transmitter coupled to the determination element for transmitting the response to the infrastructure. The infrastructure further comprises an acknowledge receiver coupled to the acknowledge transmitter for receiving the response. The controller comprises a further processing element coupled to the acknowledge receiver for controlling further processing of the pending message by the infrastructure in accordance with the response received.

Another aspect of the present invention is an acknowledge-back selective call communication system that performs message transmission control. The system comprises an infrastructure that transmits a plurality of messages, and a selective call receiver coupled to the infrastructure for receiving and storing selected ones of the plurality of messages. The infrastructure comprises a controller for controlling the infrastructure to process the plurality of messages originated by at least one source, the controller comprising an input element coupled to the at least one source for receiving the plurality of messages, and a message transmitter coupled to the controller for transmitting the plurality of messages to the selective call receiver. The selective call receiver comprises a message receiver coupled to the message transmitter for receiving the selected ones of the plurality of messages, and a memory coupled to the message receiver for storing the selected ones of the plurality of messages. The selective call receiver further comprises a processor coupled to the memory for controlling the selective call receiver. The selective call receiver also includes a selective call address element coupled to the processor for selecting messages intended for the selective call receiver, and a determination element coupled to the processor for determining that insufficient memory space is available in the memory for storing any additional messages. The selective call receiver further comprises an acknowledge transmitter coupled to the determination element. In response to determining that insufficient memory space is available, the acknowledge transmitter transmits to the infrastructure an unsolicited notice indicating that insufficient memory space is available. The infrastructure further comprises an acknowledge receiver coupled to the acknowledge transmitter for receiving the unsolicited notice. The controller comprises a message storage element coupled to the acknowledge receiver for storing, in response to the unsolicited notice, an additional message intended for the selective call receiver.

DESCRIPTION OF THE PREFERRED EMBODIMENT

Acknowledge-back selective call communication systems were developed in the late 1980's. Such systems have utilized an acknowledge-back transmitter within a selective call receiver to send an acknowledge signal back to the infrastructure from which a message has been received. The purpose of the acknowledge signal typically has been to confirm receipt of the message and further to allow a user of the selective call receiver to generate a brief response having a meaning such as "cannot comply", "will comply immediately", "will comply later", etc. U.S. Pat. No. 4,875,038 to Siwiak et al., which describes an acknowledge-back selective call communication system, is hereby incorporated herein by reference.

Figure 1:
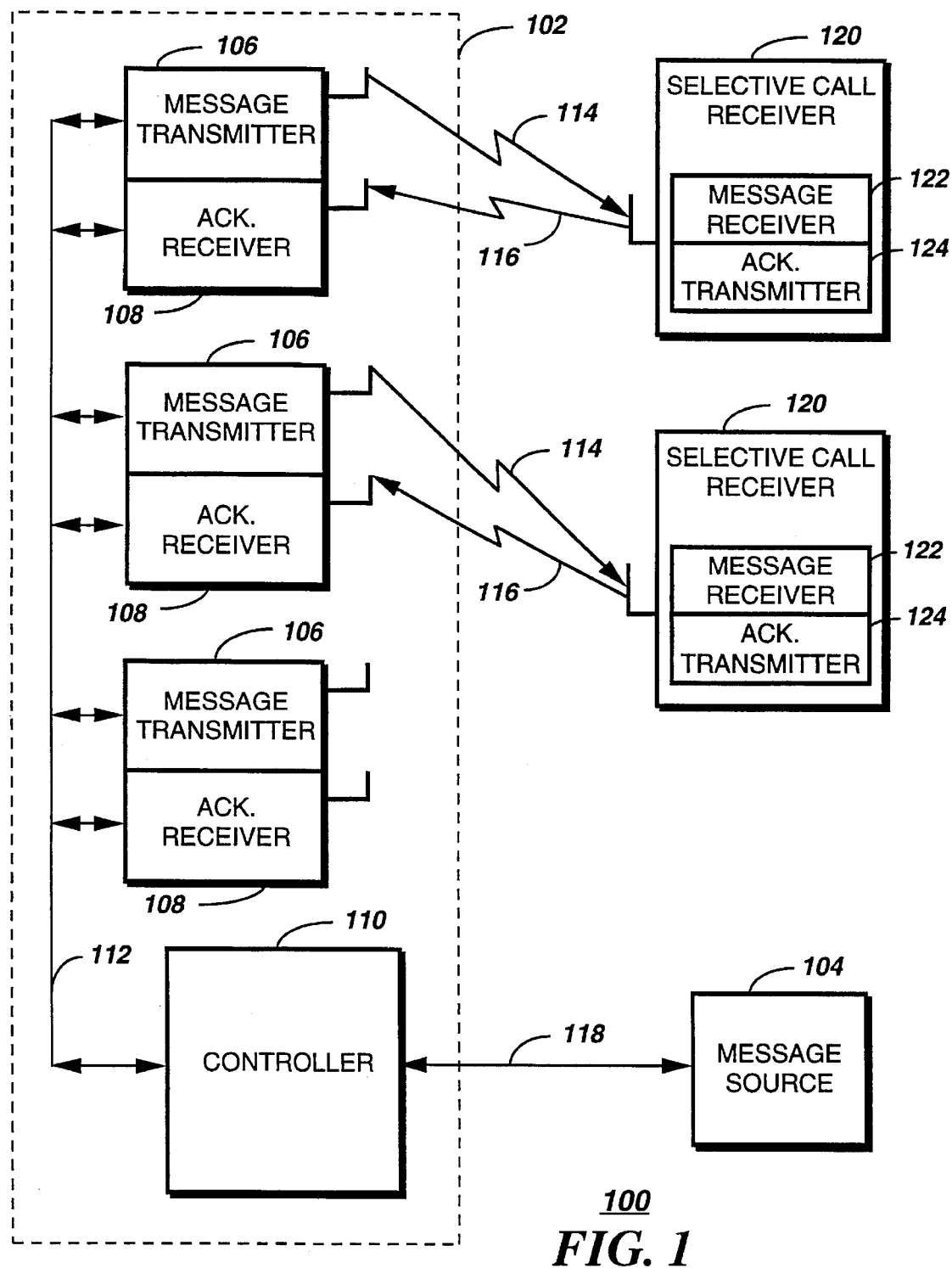
FIG. 1 is an electrical block diagram of an acknowledge-back selective call communication system including an infrastructure and a selective call receiver in accordance with the preferred embodiment of the present invention.

The preferred embodiment of the present invention adds a novel message transmission control capability to an acknowledge-back selective call communication system, as will be described in detail herein below. FIG. 1 depicts an electrical block diagram of an acknowledge-back selective call communication system 100 including an infrastructure 102 and at least one selective call receiver 120 in accordance with the preferred embodiment of the present invention. The infrastructure 102 includes at least one message transmitter 106 linked by an outbound radio link 114 with a message receiver 122 in the selective call receiver 120. The message transmitter 106 is for transmitting selective call messages to the selective call receiver 120. The infrastructure also includes at least one acknowledge receiver 108 linked by an inbound radio link 116 with an acknowledge transmitter 124 in the selective call receiver 120. The acknowledge receiver 108 is for receiving an acknowledge signal from the selective call receiver 120.

While FIG. 1 depicts a one-to-one correspondence between the message transmitter 106 and the acknowledge receiver 108, it will be appreciated that other relationships can exist as well. For example, each message transmitter 106 can be associated with a plurality of acknowledge receivers 108. This relationship is typical in a system in which the message transmitter 106 is a high-power, i.e., long range, transmitter, while the acknowledge transmitter 124 is a low-power, i.e., short range, transmitter. Such a system requires multiple, geographically dispersed acknowledge receivers 108 for reliable reception of the acknowledge transmitter 124 throughout the coverage area of the message transmitter 106.

Transactions that take place over the radio links 114, 116 preferably utilize one of the well-known selective call signaling protocols, such as Golay Sequential Code (GSC) or Post Office Code Standardization Advisory Group (POCSAG) protocol, although it will be appreciated that other signaling protocols can be utilized as well. The message transmitters 106 and the acknowledge receivers 108 are coupled by a conventional communication link 112 to a controller 110 for controlling the infrastructure. The controller 110 is coupled by at least one conventional input link 118 to at least one message source 104 for originating a message intended for one of the selective call receivers 120.

Preferably, the acknowledge receiver 108 is a conventional double-conversion, narrowband FSK receiver, and the acknowledge transmitter 124 is a conventional low-power, narrowband, FSK transmitter. Preferably, the message transmitter 106 is similar to a model C73 PURC 5000® transmitter, the hardware of the controller 110 is similar to that of the MPS 2000™ paging control center, and the message receiver 122 is similar to that of a model A03KLB5962CA ADVISOR® pager, all manufactured by Motorola, Inc. of Schaumburg, Ill. It will be appreciated that other similar hardware may be used as well to construct the acknowledge-back selective call communication system 100.

The message source 104 is preferably a person calling from a telephone via the Public Switched Telephone Network (PSTN). Alternatively, the message source 104 may comprise a keyboard/display terminal, a facsimile machine, or a computer generating a message either automatically or under control of a user. The message itself preferably comprises numeric and alphanumeric characters, graphics, or voice. It will be appreciated that other types of message conveyances and message generating devices can also be utilized for the message and the message source 104. It will be further appreciated that the input link 118 can comprise a telephone line or trunk circuit, a wireless link, a dedicated wireline, a packet switched network, or other kind of communication link, as well as the PSTN.

Briefly, in operation, the message source 104 preferably inputs a message and an intended selective call receiver identifier (ID) into the acknowledge-back selective call communication system 100. The message and ID, for example, could be the telephone number of the message source and the address of the intended selective call receiver 120, entered as dual-tone multifrequency signals (DTMF) from a push-button telephone dial. The controller 110 stores the message and ID in a memory therein, and, in accordance with the preferred embodiment of the present invention, sends the ID and a message length value for the pending message to the message transmitters 106.

The message transmitters 106 transmit the ID and the message length value over the outbound radio link 114. The selective call receiver 120 that matches the ID decodes the message length value and transmits the ID and a response, utilizing the acknowledge transmitter 124. The response preferably is either a request to send or a request to delay, based upon a comparison of the message length value with the available memory space in the selective call receiver 120. The acknowledge receiver 108 receives the ID and the response and sends them to the controller 110 over the communication link 112. The controller 110 then controls further processing of the pending message for the selective call receiver 120 matching the ID in accordance with the response received therefrom.

Preferably, the ID transmitted from the selective call receiver 120 is the same as the ID transmitted from the message transmitters 106. Alternatively, the ID transmitted from the selective call receiver 120 can be a different ID, e.g., an abbreviated form of the ID transmitted from the message transmitters 106. The transmission of the ID by the selective call receiver 120 can be eliminated entirely, provided that sufficient information can be determined by the controller 110 from the transmission of the selective call receiver 120 to uniquely identify the responding selective call receiver 120. For example, if the system is designed such that the selective call receiver 120 responds a predetermined interval after the transmission of the message length value, then the time of the response can be used to uniquely identify the responding selective call receiver 120.

If the response is a request to send, then the controller 110 sends the ID and the pending message over the communication link 112 to the message transmitters 106, which transmit the ID and the pending message to the selective call receiver 120. The controller 110 then preferably deletes the pending message from its memory. If, on the other hand, the response is a request to delay, the controller 110 retains the pending message in the memory therein for later transmission and waits for a predetermined delay before retransmitting the message length value in another attempt to deliver the pending message.

After determining that memory space is insufficient for the pending message, the selective call receiver 120 indicates to the user that memory space is insufficient by generating an audible, tactile, or visible indication in a manner well known in the art. If the user elects to make additional memory space available in the selective call receiver 120 (by deleting one or more messages stored therein), then the selective call receiver 120 will respond with a request to send after the next retransmission of the message length value. Alternatively, the selective call receiver 120 can generate an unsolicited request to send response immediately after additional memory space becomes available. Following the request to send response, the controller 110 will send the ID and the pending message over the communication link 112 to the message transmitters 106, which will transmit the ID and the pending message to the selective call receiver 120. The controller 110 then preferably will delete the pending message from its memory. The operational details and protocols of the system in accordance with the preferred embodiment of the present invention are described more fully herein below.

Figure 2:
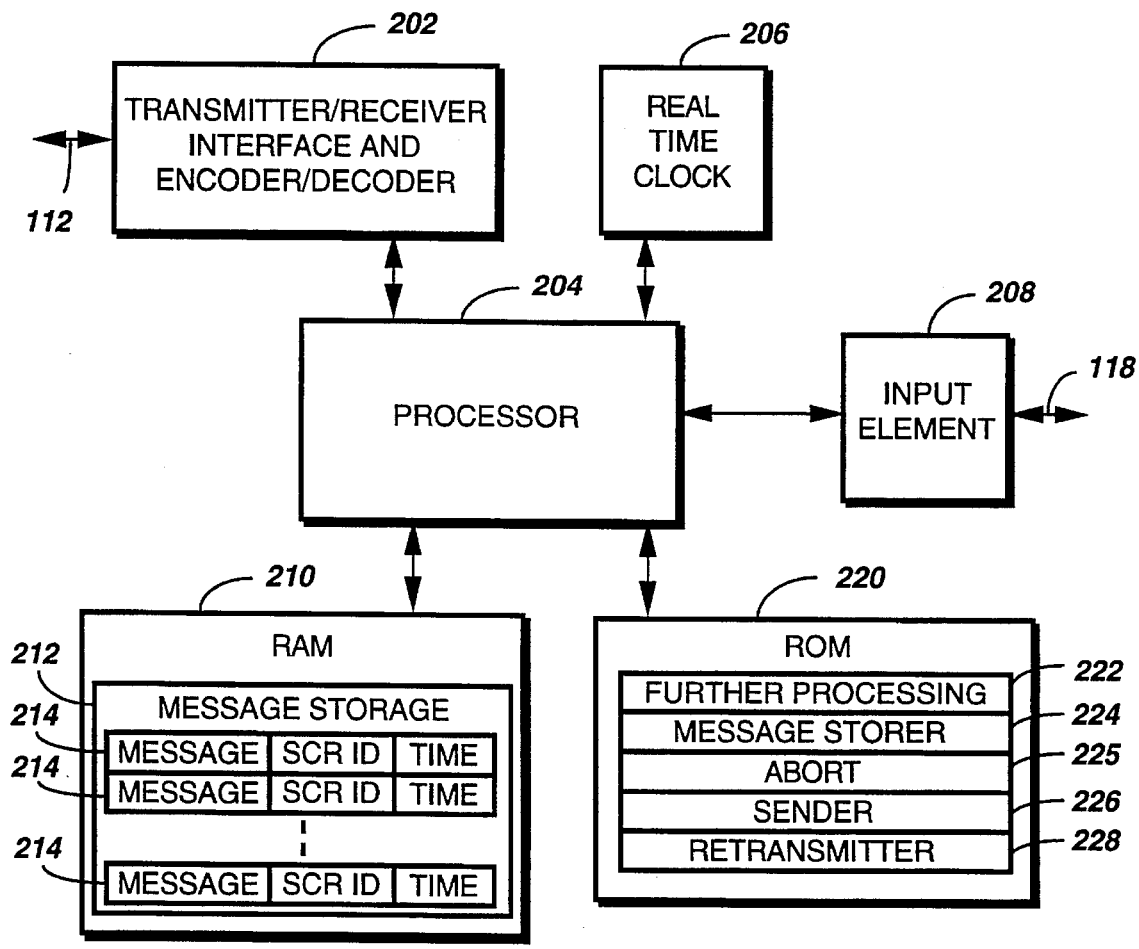
FIG. 2 is an electrical block diagram of a controller within the infrastructure in accordance with the preferred embodiment of the present invention.

FIG. 2 is an electrical block diagram of the controller 110 within the infrastructure 102 in accordance with the preferred embodiment of the present invention. The controller 110 comprises a transmitter/receiver interface and encoder/decoder 202 for communicating with the message transmitters 106 and the acknowledge receivers 108 over the communication link 112. The transmitter/receiver interface and encoder/decoder 202 is coupled to a processor 204, which controls the operation of the controller 110. The processor 204 is coupled to a real time clock 206 for providing a time stamp for events occurring in the communication system 100. The processor 204 is also coupled to an input element 208 for receiving messages from the message source 104 over the input link 118.

The processor 204 is further coupled to a random access memory (RAM) 210 for storing items requiring temporary storage. The RAM comprises a message storage area 212 for storing pending received messages. The message storage area 212 comprises a plurality of message records 214 containing a message, an ID of the selective call receiver 120 associated with the message, and a time stamp associated with the message. The processor 204 is also coupled to a read-only memory (ROM) 220 comprising firmware elements for controlling the processor 204. The firmware elements comprise a further processing element 222 for controlling further processing of the pending message in accordance with responses received from the selective call receiver 120.

The firmware elements further comprise a message storer element 224 for retaining the pending message in the message storage area 212 for later retransmission, in response to receiving a request to delay from the selective call receiver 120. Also included is an abort element 225 for aborting the transmission of further message packets for the selective call receiver 120, in response to receiving the request to delay. The firmware elements also comprise a sender element 226 for sending the pending message to the selective call receiver 120, in response to receiving therefrom a request to send. In addition, the firmware elements include a retransmitter element 228 for retransmitting the message length value after a predetermined delay, in response to having received a request to delay in a most recent prior response from the selective call receiver 120. The operation of the controller 110 in accordance with the preferred and alternative embodiments of the present invention is also described in further detail herein below.

As stated herein above, the hardware of the controller 110 is similar to that of the MPS 2000™ paging control center. It will be appreciated that other types of memory, e.g., magnetic disk memory, optical memory, electrically erasable programmable random access memory (EEPROM), can be substituted as well for the RAM 210 and the ROM 220.

Figure 3:
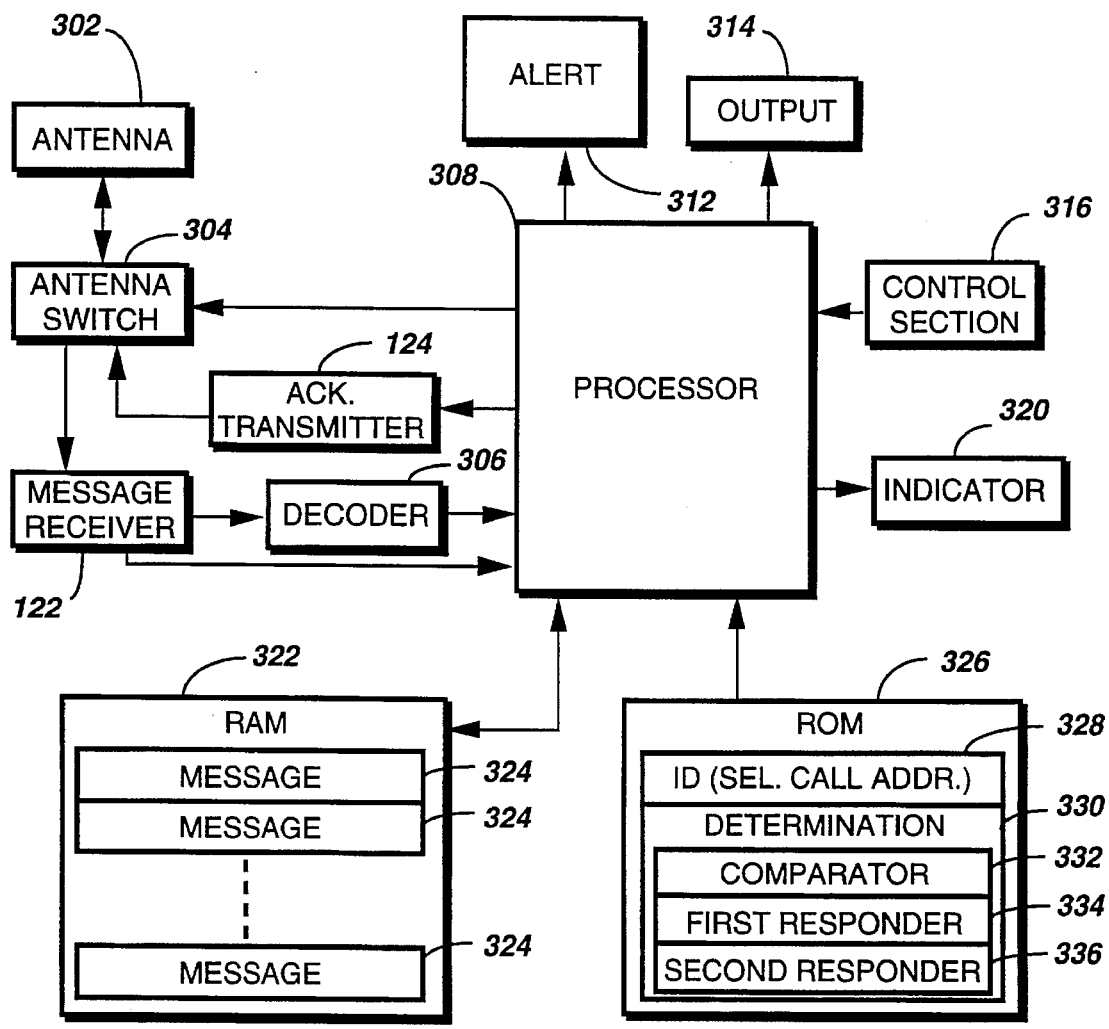
FIG. 3 is an electrical block diagram of the selective call receiver in accordance with the preferred embodiment of the present invention.

FIG. 3 is an electrical block diagram of the selective call receiver 120 in accordance with the preferred embodiment of the present invention. The selective call receiver 120 comprises an antenna 302 for intercepting the messages transmitted from the message transmitters 106 as radio signals. The antenna 302 is coupled to a conventional antenna switch 304 for steering the radio signals therefrom. The antenna switch is coupled to a processor 308 for control thereby. The antenna switch 304 is further coupled to the message receiver 122 for demodulating the radio signals steered therefrom. The message receiver 122 is coupled to a decoder 306 and to the processor 308 for decoding and processing information carried in the radio signals. The processor 308 is coupled to a memory 322, e.g., a conventional random access memory (RAM), for storing the messages received in memory locations 324 therefor. The processor 308 is also coupled to an output element 314, such as a conventional liquid crystal display (LCD) or a loudspeaker, for visibly or audibly outputting the messages received.

The processor 308 is further coupled to a control section 316, comprising well-known switches and buttons, for allowing a user to control the selective call receiver 120. In addition, the processor 308 is coupled to an alert element 312, e.g., a conventional piezoelectric transducer (PZT) or lamp for generating an audible or visible alert in response to receiving information intended for the selective call receiver 120. An indicator 320, e.g., a conventional PZT, light emitting diode (LED), or LCD, is also coupled to the processor 308 for providing an audible or visible indication to the user that there is insufficient memory in the selective call receiver 120 to receive a pending message. It will be appreciated that the indicator 320 can be integrated with either the output element 314 or the alert element 312, or both, as well.

The processor 308 is also coupled to the acknowledge transmitter 124 for controlling the generation of acknowledge messages therefrom. The acknowledge transmitter 124 is coupled to the antenna switch 304 for steering the acknowledge messages to the antenna 302 for transmission to the infrastructure 102. The processor 308 is further coupled to a read-only memory (ROM) 326 comprising firmware elements including a selective call address 328 for uniquely identifying the selective call receiver 120. The firmware elements preferably also include a determination element 330 for determining, from a message length value received, a response based upon the length and memory space available in the memory 322.

The determination element 330 includes a comparator element for comparing the memory space available with the length of the pending message to determine whether sufficient memory space is available to store the pending message. The determination element 330 also includes a first responder element 334 for making the response a request to send the pending message, in response to sufficient memory space being available. The determination element 330 further includes a second responder element 336 for making the response a request to delay the pending message, in response to insufficient memory space being available.

It will be appreciated that other types of non-volatile memory, e.g., EEPROM, battery-backed-up RAM, programmable read-only memory (PROM), etc., can be substituted for the ROM 326. It will be further appreciated that the processor 308, the RAM 322, the ROM 326, and the decoder 306 can be combined in whole or in part as a contiguous integrated circuit device. It will also be appreciated that the antenna switch 304 can be replaced by a circulator or by dual antennas, as well, and that either simplex or full duplex transmission/reception can be utilized by the selective call receiver 120.

Figure 4:
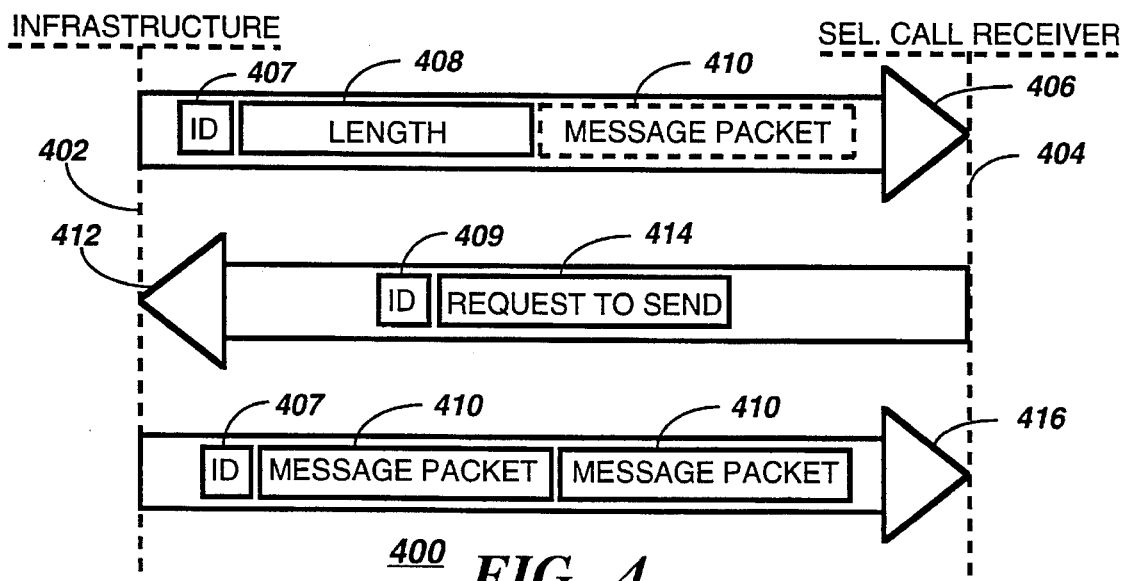
FIG. 4 is a protocol diagram depicting transactions transmitted between the infrastructure and the selective call receiver in accordance with the preferred embodiment of the present invention, the transactions beginning when sufficient receiver memory is available.

FIG. 4 is a protocol diagram 400 depicting transactions transmitted between the infrastructure 102 and the selective call receiver 120 in accordance with the preferred embodiment of the present invention. The transactions depicted in the protocol diagram 400 are those which occur wherein the selective call receiver 120 determines that sufficient receiver memory space is available therein for receiving a pending message. The infrastructure 102 is represented by an infrastructure dashed line 402, while the selective call receiver 120 is represented by a selective call receiver dashed line 404. Each transaction is represented by a box arrow. A box arrow directed from the infrastructure dashed line 402 to the selective call receiver dashed line 404, e.g., the message length transaction 406, is a transaction transmitted from the infrastructure 102 to the selective call receiver 120. A box arrow directed from the selective call receiver dashed line 404 to the infrastructure dashed line 402, e.g., the request to send transaction 412, is a transaction transmitted from the selective call receiver 120 to the infrastructure 102.

The message length transaction 406 comprises an identifier (ID) 407 for identifying the selective call receiver 120 for which a pending message has been received by the infrastructure 102. The ID 407 preferably is followed by a message length value 408 for specifying to the selective call receiver 120 the length of the pending message, the length having been computed by the controller 110 in a conventional manner. Optionally, the message length transaction 406 can comprise at least one message packet 410 including a portion of the pending message.

If sufficient memory space is available in the selective call receiver 120 to store a message of the length specified, the selective call receiver 120 responds to the message length transaction 406 by sending the request to send transaction 412, comprising an ID 409 for identifying the responding selective call receiver 120, and a request to send command 414. As discussed earlier herein, the ID 409 is preferably the same as the ID 407. In alternative systems, however, the ID 409 may differ from the ID 407, or be omitted, depending on design choice.

The controller 110 processes the pending message in accordance with the response received from the identified selective call receiver 120. Having received the request to send transaction 412, the controller 110 of the infrastructure 102 responds with a message transaction 416. The message transaction 416 comprises the ID 407, followed by the at least one message packet 410 comprising the pending message.

It will be appreciated that other acknowledge-back transactions, such as the "cannot comply" response mentioned earlier herein, can occur in the acknowledge-back selective call communication system 100. Such other transactions are not depicted in the protocol diagrams of FIGS. 4–5 and FIG. 9, as they are not considered germane to the described embodiments of the present invention.

Figure 5:
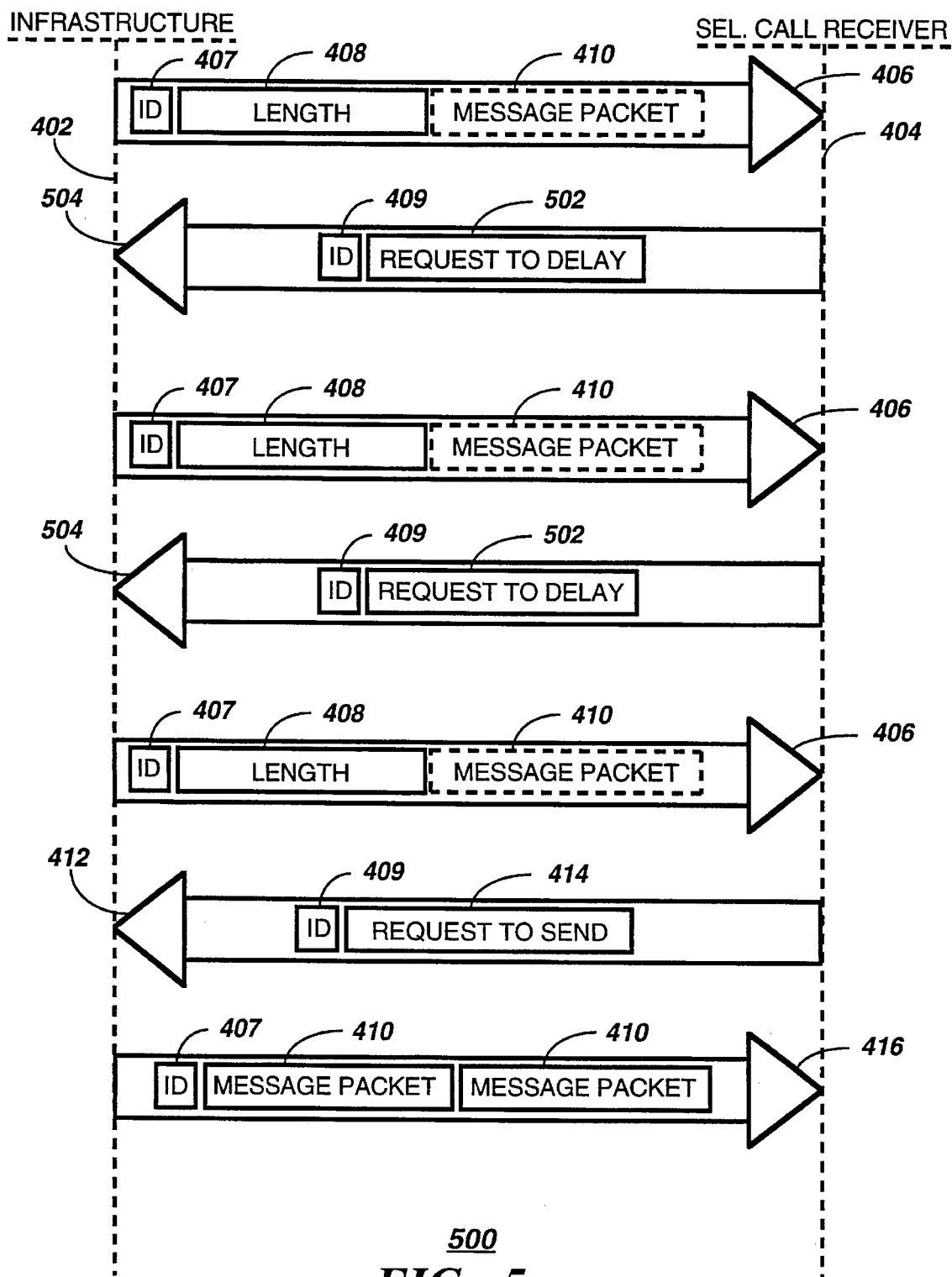
FIG. 5 is a protocol diagram depicting transactions transmitted between the infrastructure and the selective call receiver in accordance with the preferred embodiment of the present invention, the transactions beginning when insufficient receiver memory is available.

FIG. 5 is a protocol diagram 500 depicting transactions transmitted between the infrastructure 102 and the selective call receiver 120 in accordance with the preferred embodiment of the present invention. The transactions depicted in the protocol diagram 500 are an example of those which can occur wherein the selective call receiver 120 determines that insufficient memory space is available therein for receiving the pending message. The first transaction is the message length transaction 406 described previously for the protocol diagram 400. Having determined, however, that there is insufficient memory space, the selective call receiver 120 responds to the message length transaction 406 with a request to delay transaction 504. The request to delay transaction 504 comprises the ID 409, followed by a request to delay command 502. After a predetermined delay, the controller 120 retransmits the message length transaction 406, which can be, for example, again responded to with another request to delay transaction 504.

After another predetermined delay, the user of the selective call receiver 120 has noticed an indication of the memory insufficiency and has taken measures to make more memory available in the selective call receiver 120, e.g., the user has discarded an old message. The controller 120 again retransmits the message length transaction 406, which this time is responded to with the request to send transaction 412. The controller 120 then responds with the message transaction 416.

Thus, the preferred embodiment of the present invention advantageously provides a method and apparatus that can control the loss of new incoming messages when there is insufficient memory available in the selective call receiver 120 for storing the new messages. The method and apparatus stores a pending message in the infrastructure 102 when there is insufficient memory space in the selective call receiver 120, and brings the problem to the attention of the user of the selective call receiver 120 for correction of the memory insufficiency. After correction of the memory insufficiency, the infrastructure 102 advantageously and automatically sends the stored pending message to the selective call receiver 120, in accordance with the preferred embodiment of the present invention.

Figure 6:
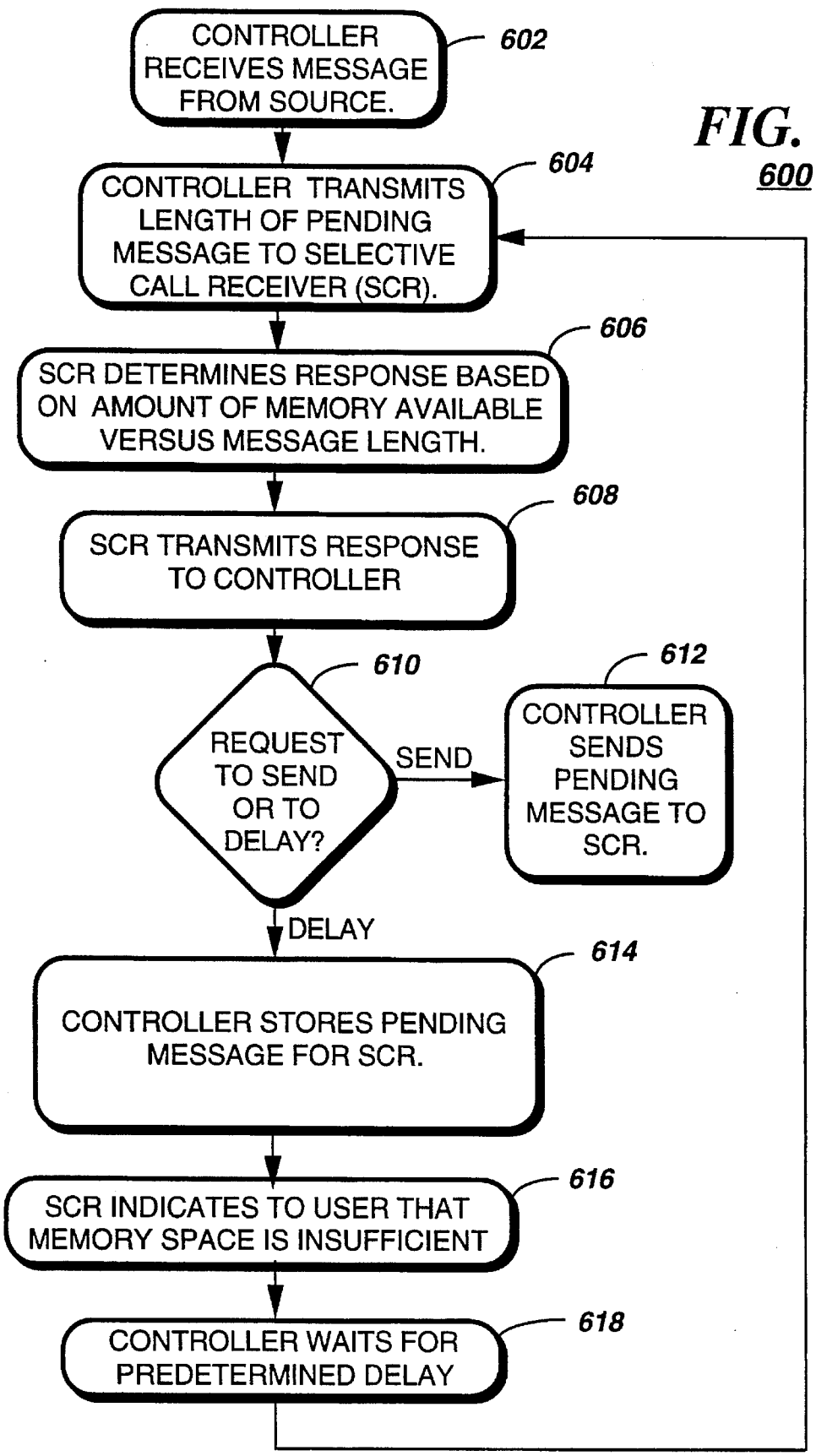
FIG. 6 is a flow chart depicting operation of the communication system in accordance with the preferred embodiment of the present invention.

FIG. 6 is a flow chart 600 depicting operation of the communication system 100 in accordance with the preferred embodiment of the present invention. It will be appreciated that the transactions occurring between the infrastructure 102 and the selective call receiver 120 preferably are performed in accordance with the applicable protocol diagram 400, 500. Operation begins in the flow chart 600 when the input element 208 of the controller 110 receives 602 over the at least one input link 118 a message intended for the selective call receiver 120 from the message source 104. In response, the processor 204 of the controller 110 accesses the transmitter/receiver interface and encoder/decoder 202 to communicate with the at least one message transmitter 106 over the communication link 112 to transmit 604 the message length transaction 406 to the selective call receiver 120.

In response, the processor 308 of the selective call receiver 120 checks the RAM 322 to determine how much memory space is available for storing the pending message. The processor 308 then accesses the determination element 330 to determine 606 a response based upon a comparison by the comparator element 332 of the message length value 408 received and the memory space available. The processor 308 then accesses the acknowledge transmitter 124 and antenna switch 304 to transmit 608, by either the request to send transaction 412 or the request to delay transaction 504, an appropriate response. The at least one acknowledge receiver 108 receives the response and communicates the response to the controller 110 over the communication link 112. The processor 204 of the controller 110 then accesses the further processing element 222 to control further processing of the pending message for the selective call receiver 120 in accordance with the response. In step 610 the processor 204 determines whether the response was the request to send transaction 412, or the request to delay transaction 504. If it was a request to send, the processor 204 accesses the sender element 226 to control the transmitter/receiver interface and encoder/decoder 202 to communicate with the at least one message transmitter 106 over the communication link 112 to send 612 the pending message to the selective call receiver 120 by the message transaction 416.

If, on the other hand, in step 610 the processor 204 determines that the response was a request to delay, then the processor 204 accesses the message storer element 224 to store 614 the pending message, the ID of the associated selective call receiver 120, and a time stamp as one of the plurality of message records 214 in the RAM 210. If the message length transaction 406 comprised a message packet 410, the processor 204 also accesses the abort element 225 to abort sending any further packets of the pending message at this time.

In addition to sending the request to delay transaction 504, the selective call receiver 120 utilizes the indicator 320 to indicate 616 to its user that memory space is insufficient to receive the pending message. Meanwhile, the controller accesses the retransmitter element 228 and waits 618 for a predetermined delay after transmitting the previous message length transaction 406, and then returns to step 604 to retransmit the message length transaction 406 in hopes of this time receiving the request to send transaction 412 in response.

Figure 7:
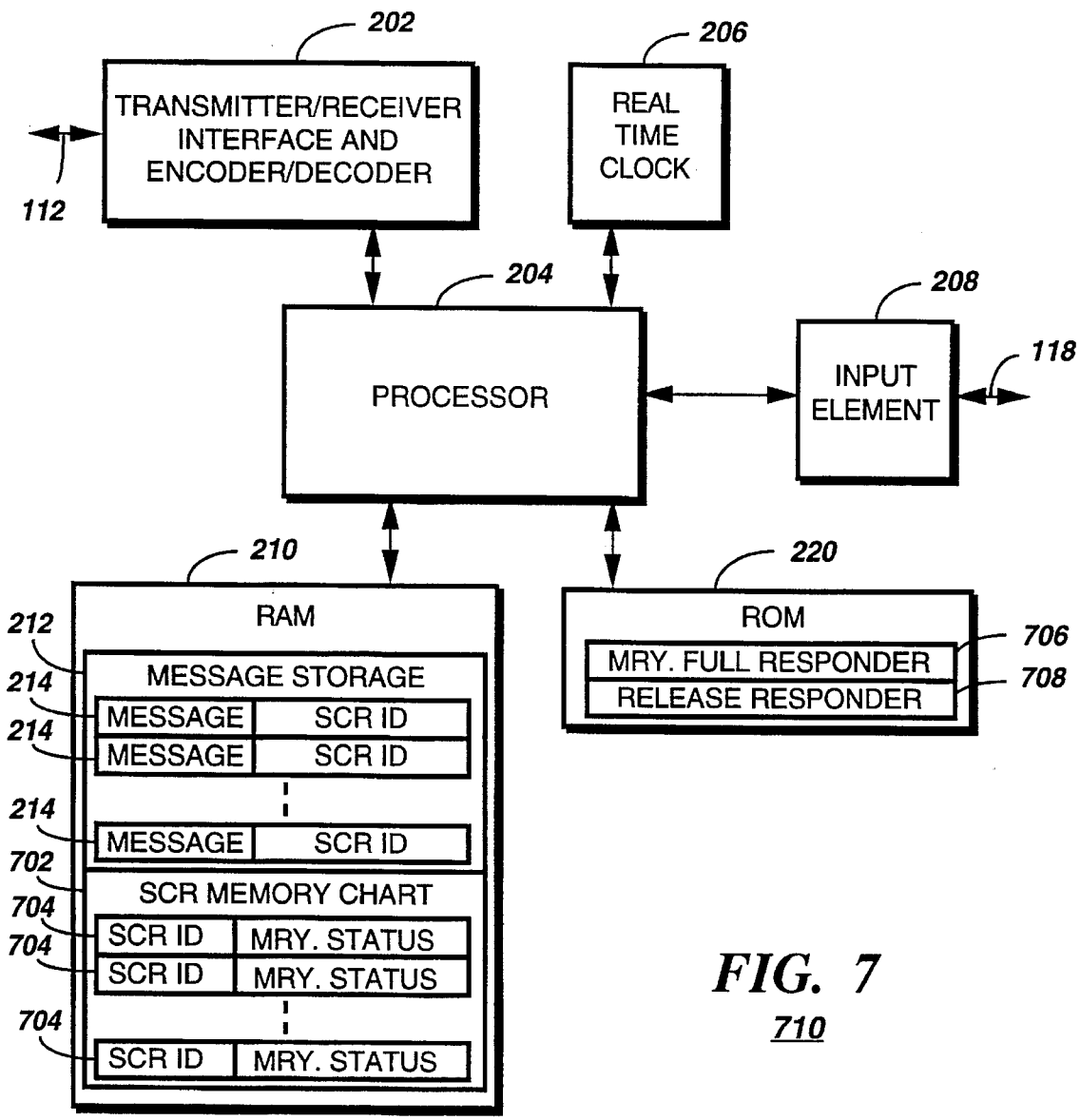
FIG. 7 is an electrical block diagram of a controller within the infrastructure in accordance with an alternative embodiment of the present invention.

FIG. 7 is an electrical block diagram of a controller 710 within the infrastructure in accordance with an alternative embodiment of the present invention. The controller 710 is substantially identical to the controller 110, the essential differences being the arrangement and contents of the RAM 210 and the ROM 220. In the controller 710, the RAM 210 comprises an additional selective call receiver memory chart 702 including a plurality of memory status records 704, each comprising a selective call receiver identifier (ID) and a corresponding memory status for indicating whether the RAM 322 of the identified selective call receiver 820 (FIG. 8) in accordance with the alternative embodiment of the present invention is full. The ROM 220 of the controller 710 comprises a memory full responder element 706 for responding to a memory full notice from the selective call receiver 820 by storing subsequent messages for the selective call receiver 20. Also included in the ROM 220 is a release responder 708 for transmitting, in response to a release transaction from the selective call receiver 820, any subsequent messages stored for the selective call receiver 820.

Figure 8:
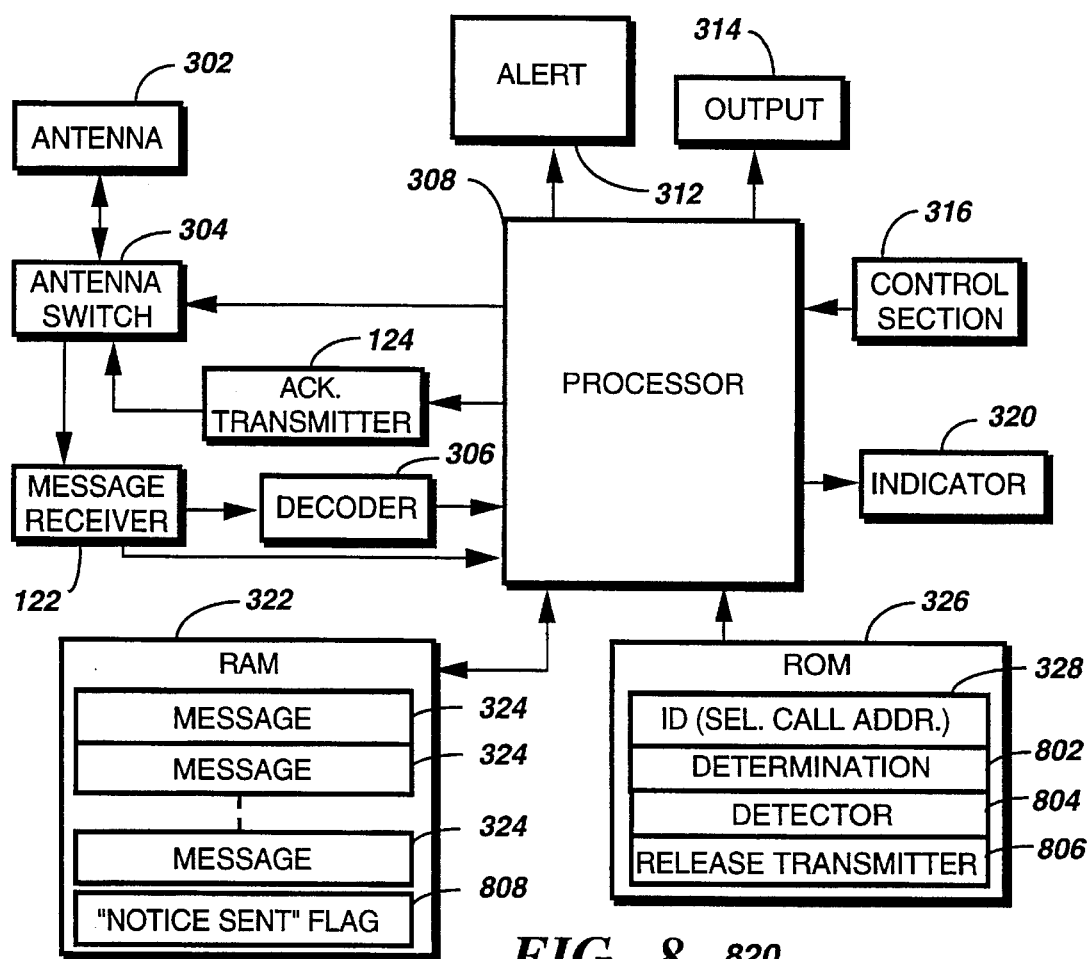
FIG. 8 is an electrical block diagram of a selective call receiver in accordance with the alternative embodiment of the present invention.

FIG. 8 is an electrical block diagram of a selective call receiver 820 in accordance with the alternative embodiment of the present invention. The selective call receiver 820 is substantially identical to the selective call receiver 120, the essential difference being the arrangement and contents of the RAM 322 and the ROM 326. In the selective call receiver 820, the RAM 322 includes an additional "notice sent" flag 808 for keeping track of whether the selective call receiver 820 has sent a memory full notice to the controller 710. Also, the ROM 326 comprises a determination element 802 for determining that insufficient memory space is available in the RAM 322 for storing any additional messages. The ROM 326 further comprises a detector element 804 for detecting, after transmitting the memory full notice, that sufficient memory space has become available in the RAM 322 for storing another message. The ROM 326 also includes a release transmitter element 806 for controlling the acknowledge transmitter 124 to transmit to the controller 710 a release indicating that memory space has become available.

It will be appreciated that the definition of "sufficient" memory space for receiving an additional message is somewhat arbitrary, as sufficiency depends on the size of the additional message, which size is generally unknown to the selective call receiver 820 in accordance with the alternative embodiment. For this reason, the alternative embodiment appears best suited for applications in which message length is somewhat constant and predictable.

Figure 9:
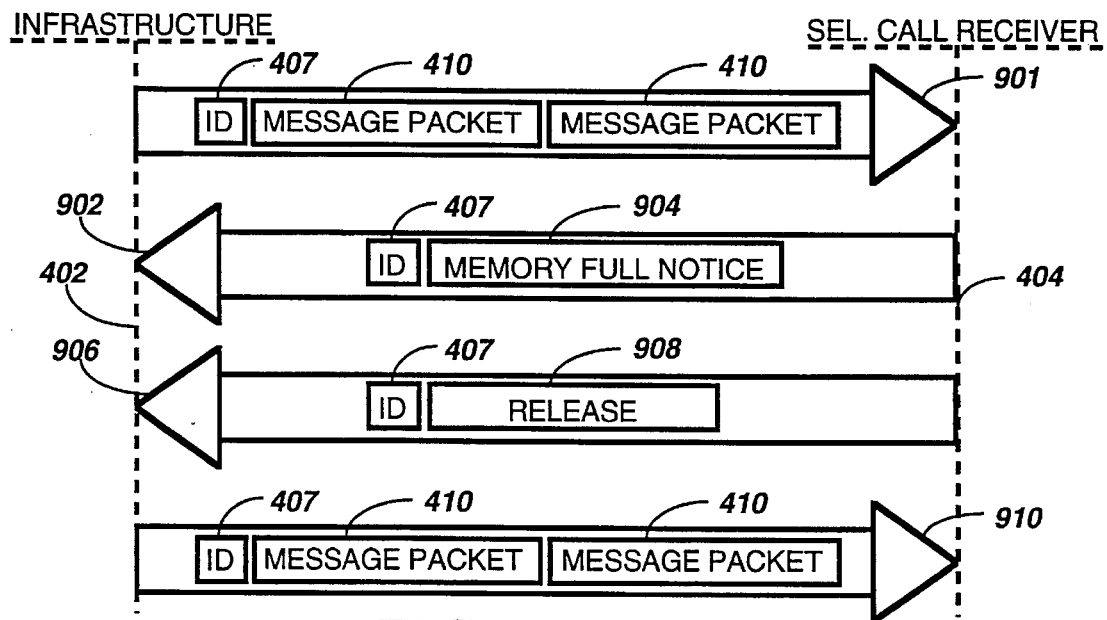
FIG. 9 is a protocol diagram depicting transactions transmitted between the controller and the selective call receiver in accordance with the alternative embodiment of the present invention, the transactions beginning when sufficient receiver memory is available.

FIG. 9 is a protocol diagram 900 depicting example transactions transmitted between the controller 710 and the selective call receiver 820 in accordance with the alternative embodiment of the present invention, the transactions beginning when sufficient receiver memory is available. The first transaction of the protocol diagram 900 is a message transaction 901, which is substantially identical to the message transaction 416 in accordance with the preferred embodiment. In the absence of having received an indication to the contrary from the selective call receiver 820, the message transaction 901 can be sent at any time in accordance with the alternative embodiment. Some time after the message transaction 901, however, the selective call receiver 820 spontaneously transmits a memory full transaction 902 to the controller 710. This could occur, for example, because the user of the selective call receiver 820 has "locked" a plurality of received messages, thereby reserving substantially all of the memory space therein. The memory full transaction 902 comprises the ID 407, i.e., the complete selective call address of the selective call receiver 820. (The complete address is preferred, because the transaction is sent spontaneously and thus cannot be related by transmission time to a particular earlier sent ID 407 from the controller 710.) The memory full transaction 902 further comprises a memory full notice 904.

In response to the memory full transaction 902, the controller 710 sends no further message transactions until the selective call receiver 820 sends a release transaction 906, comprising the ID 407 and a release 908. After the release transaction 906, the controller 710 sends a next message transaction 910, substantially identical to the message transaction 416 of the preferred embodiment. The message transaction 910 can contain a message stored by the controller 710 between the receipt of the memory full transaction 902 and the receipt of the release transaction 906, as well as a new message received after the release transaction 906.

Figure 10:
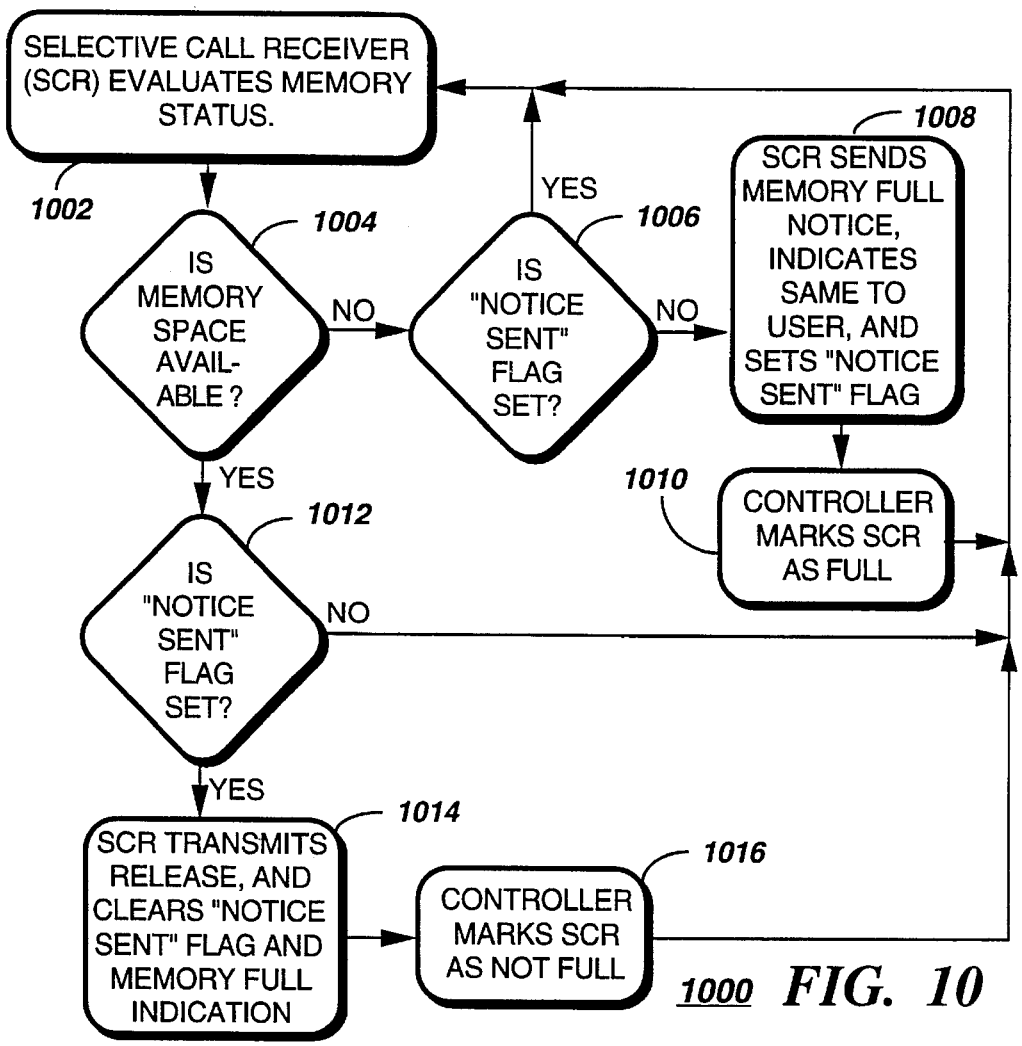
FIG. 10 is a flow chart depicting operation of memory status control in the selective call receiver and the controller in accordance with the alternative embodiment of the present invention.

FIG. 10 is a flow chart 1000 depicting operation of memory status control in the selective call receiver 820 and the controller 710 in accordance with the alternative embodiment of the present invention. The flow begins with the processor 308 of the selective call receiver 820 accessing the determination element 802 to evaluate 1002 whether insufficient memory space is available. In step 1004 if sufficient memory space is not available, flow continues to step 1006, where the processor 308 checks the "notice sent" flag 808 to see if the flag is set. If so, no action is required, and the flow returns to step 1002. If the "notice sent" flag 808 is not set, then the processor 308 accesses the acknowledge transmitter 124 and the antenna switch 304 to send 1008 the memory full transaction 902 to the controller 710. In addition, the processor 308 accesses the indicator element 320 to indicate to the user that memory is full, and sets the "notice sent" flag 808. In response, the processor 204 of the controller 710 accesses the appropriate one of the plurality of memory status records 704 and marks 1010 the memory status as "full". Then flow returns to step 1002.

If, on the other hand, in step 1004 memory space is determined to be available, then flow moves to step 1012 to determine whether the "notice sent" flag is set. If not, no action is required, and the flow returns to step 1002. If in step 1012 the "notice sent" flag 808 is set, then the processor 308 accesses the acknowledge transmitter 124 and the antenna switch 304 to transmit 1014 the release transaction 906 to the controller 710. In addition, the processor 308 accesses the indicator element 320 to indicate to the user that memory is no longer full, and clears the "notice sent" flag 808. In response, the processor 204 of the controller 710 accesses the appropriate one of the plurality of memory status records 704 and marks 1016 the memory status as "not full". Then flow returns to step 1002.

Figure 11:
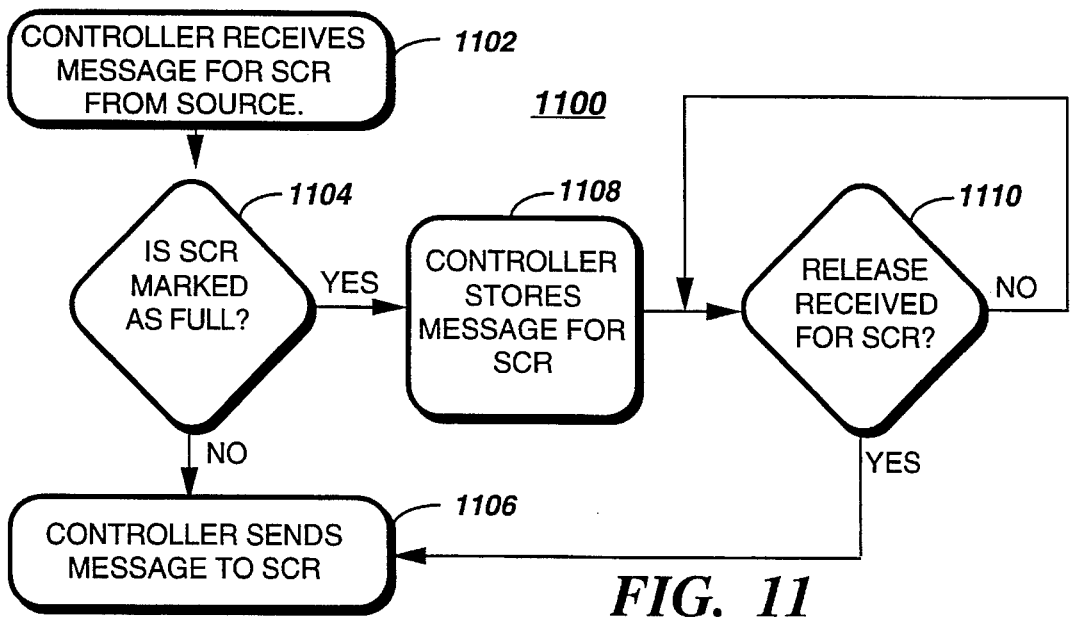
FIG. 11 is a flow chart depicting message processing in the controller in accordance with the alternative embodiment of the present invention.

FIG. 11 is a flow chart depicting message processing in the controller 710 in accordance with the alternative embodiment of the present invention. When the controller 710 receives 1102 a message for the selective call receiver 820 from the message source 104, the processor 204 accesses the corresponding one of the plurality of memory status records 704 to determine 1104 whether the memory status of the selective call receiver 820 is marked as "full". If not, the processor 204 accesses the transmitter/receiver interface and encoder/decoder 202 to communicate with the at least one message transmitter 106 over the communication link 112 to send 1106 the pending message to the selective call receiver 120 by the message transaction 901. If, on the other hand, in step 1104 the processor 204 determines that the memory status of the selective call receiver 820 is marked as "full", then the processor 204 accesses the memory full responder element 706 to store the pending message, along with the ID of the selective call receiver 820, in one of the plurality of message records 214 in the RAM 210. The processor 204 then waits 1110 to receive the release transaction 906 from the selective call receiver 820. When the release transaction 906 is received, the processor 204 accesses the release responder element 708 to retrieve the stored message from the RAM 210 and send 1106 the message to the selective call receiver 820.

It will be appreciated that the alternative embodiment of the present invention provides control of message transmissions responsive to memory availability in the selective call receiver 820, as does the preferred embodiment. The alternative embodiment advantageously accomplishes message transmission control with fewer transactions between the infrastructure and the selective call receiver, because, unlike in the preferred embodiment, the controller does not continue to "test" for memory availability after being notified that the memory of the selective call receiver is insufficient. A potential limitation of the alternative embodiment, however, is that if the infrastructure does not correctly receive the release transaction 906 from the selective call receiver 820, messages for the selective call receiver 820 could be stored indefinitely. This limitation could be minimized by requiring a handshake from the infrastructure 102 in response to the release transaction 906, if there are no stored messages waiting to be sent to the selective call receiver 820. If the selective call receiver 820 has received neither a message nor the handshake within a predetermined period after sending the release transaction 906, the selective call receiver 820 would retransmit the release transaction 906.

Thus, it should by now be clear that the present invention advantageously provides a method and apparatus that can minimize the loss of new incoming messages due to insufficient memory space being available in the selective call receiver for storing the new messages. The method and apparatus advantageously can bring the memory problem to the attention of the user of the selective call receiver, thereby allowing the user to correct the problem by deleting old messages from the memory. Preferred and alternative embodiments have been described, advantageously allowing flexibility of system operation according to specific system needs.

What is claimed is:

1. A method of controlling message transmissions in an acknowledge-back selective call communication system comprising an infrastructure and a selective call receiver that receives a plurality of messages transmitted from the infrastructure, the plurality of messages having a length that is variable, wherein the selective call receiver stores the plurality of messages in a memory, the method comprising the steps of:

transmitting information from the infrastructure to the selective call receiver, the information comprising the length of a pending message;

determining therefrom by the selective call receiver a response based upon the length of the pending message and memory space available in the memory for storing the pending message, comprising the steps of:

comparing the memory space available with the length of the pending message to determine whether sufficient memory space is available to store the pending message;

making the response a request to send the pending message, in response to sufficient memory space being available; and making the response a request to delay the pending message, in response to insufficient memory space being available, wherein the method further comprises the steps of:

transmitting the response from the selective call receiver to the infrastructure; and controlling further processing of the pending message by the infrastructure in accordance with the response.

2. The method of claim 1, wherein the controlling step comprises the steps of:

sending the pending message to the selective call receiver in response to receiving therefrom a request to send the pending message; and storing the pending message in the infrastructure for later transmission in response to receiving from the selective call receiver a request to delay the pending message.

3. The method of claim 1, further comprising the step of indicating by the selective call receiver to a user thereof that memory space is insufficient in response to insufficient memory space being available to accommodate the pending message.

4. The method of claim 1, further comprising the step of retransmitting, from the infrastructure to the selective call receiver after a predetermined delay, the information comprising the length of the pending message, in response to insufficient memory space having been available at the time of a most recent previous transmission of the information.

5. A method of controlling message transmissions in an acknowledge-back selective call communication system comprising an infrastructure and a selective call receiver that receives a plurality of messages transmitted from the infrastructure, wherein the selective call receiver stores the plurality of messages in a memory, the method comprising the steps of:

determining by the selective call receiver that insufficient space is available in the memory for storing any additional messages;

transmitting in response an unsolicited notice from the selective call receiver to the infrastructure, the notice indicating that the memory is full; and storing, by the infrastructure in response to the unsolicited notice, an additional message intended for the selective call receiver.

6. The method of claim 5, further comprising the steps of:

detecting, by the selective call receiver after transmitting the notice, that sufficient space has become available in the memory for storing another message;

transmitting in response an unsolicited release from the selective call receiver to the infrastructure, the release indicating that memory space has become available; and transmitting, by the infrastructure in response to the release, the additional message stored.

7. The method of claim 5, further comprising the step of indicating by the selective call receiver to a user thereof that the memory of the selective call receiver is insufficient to receive any additional messages, in response to determining in the determining step that insufficient space is available.

8. An acknowledge-back selective call communication system that performs message transmission control, the system comprising:

an infrastructure that transmits a plurality of messages having a length that is variable; and a selective call receiver coupled to the infrastructure for receiving and storing selected ones of the plurality of messages, wherein the infrastructure comprises:

a controller for controlling the infrastructure to process a pending message originated by a source, the controller comprising an input element coupled to the source for receiving the pending message; and a message transmitter coupled to the controller for transmitting information to the selective call receiver, the information comprising the length of the pending message, and wherein the selective call receiver comprises:
   a message receiver coupled to the message transmitter for receiving the information and the selected ones of the plurality of messages;
   a memory coupled to the message receiver for storing the selected ones of the plurality of messages;
   a processor coupled to the memory for controlling the selective call receiver;
   a selective call address element coupled to the processor for selecting messages and information intended for the selective call receiver; and
   a determination element coupled to the processor for determining from the information a response based upon the length of the pending message and memory space available in the memory for storing the pending message, the determination element comprising:
      a comparator element for comparing the memory space available with the length of the pending message to determine whether sufficient memory space is available to store the pending message;
      a first responder element coupled to the comparator element for making the response a request to send the pending message, in response to sufficient memory space being available; and
      a second responder element coupled to the comparator element for making the response a request to delay the pending message, in response to insufficient memory space being available, and wherein the selective call receiver further comprises an acknowledge transmitter coupled to the determination element for transmitting the response to the infrastructure, and wherein the infrastructure further comprises an acknowledge receiver coupled to the acknowledge transmitter for receiving the response, and wherein the controller comprises a further processing element coupled to the acknowledge receiver for controlling further processing of the pending message by the infrastructure in accordance with the response received.

9. The system of claim 8, wherein the controller comprises:
   a sender element coupled to the further processing element for sending the pending message to the selective call receiver in response to receiving therefrom a request to send the pending message; and
   a message storage element coupled to the further processing element for storing the pending message in the infrastructure for later transmission in response to receiving from the selective call receiver a request to delay the pending message.

10. The system of claim 8, wherein the selective call receiver further comprises an indicator coupled to the determination element for indicating to a user of the selective call receiver that memory space is insufficient.

11. The system of claim 8, wherein the infrastructure further comprises a retransmitter element coupled to the further processing element for retransmitting the information comprising the length of the pending message, in response to insufficient memory space having been available at the time of a most recent previous transmission of the information.

12. An acknowledge-back selective call communication system that performs message transmission control, the system comprising:
   an infrastructure that transmits a plurality of messages; and
   a selective call receiver coupled to the infrastructure for receiving and storing selected ones of the plurality of messages, wherein the infrastructure comprises:
   a controller for controlling the infrastructure to process the plurality of messages originated by at least one source, the controller comprising an input element coupled to the at least one source for receiving the plurality of messages; and
   a message transmitter coupled to the controller for transmitting the plurality of messages to the selective call receiver, and wherein the selective call receiver comprises:
   a message receiver coupled to the message transmitter for receiving the selected ones of the plurality of messages;
   a memory coupled to the message receiver for storing the selected ones of the plurality of messages;
   a processor coupled to the memory for controlling the selective call receiver;
   a selective call address element coupled to the processor for selecting messages intended for the selective call receiver;
   a determination element coupled to the processor for determining that insufficient memory space is available in the memory for storing any additional messages; and
   an acknowledge transmitter coupled to the determination element, wherein, in response to determining that insufficient memory space is available, the acknowledge transmitter transmits to the infrastructure an unsolicited notice indicating that insufficient memory space is available, and wherein the infrastructure further comprises an acknowledge receiver coupled to the acknowledge transmitter for receiving the unsolicited notice, and wherein the controller comprises a message storage element coupled to the acknowledge receiver for storing, in response to the unsolicited notice, an additional message intended for the selective call receiver.

13. The system of claim 12, wherein the selective call receiver further comprises:
   a detector element coupled to the processor for detecting, after transmitting the unsolicited notice, that sufficient memory space has become available in the memory for storing another message; and
   a release transmitter element coupled to the detector element and coupled to the processor, wherein, in response to detecting that sufficient memory space has become available, the release transmitter element controls the acknowledge transmitter to transmit to the infrastructure a release indicating that memory space has become available, and wherein the controller further comprises a release responder element coupled to the message storage element for transmitting, in response to the release, the additional message stored therein for the selective call receiver.

14. The system of claim 12, wherein the selective call receiver further comprises an indicator element coupled to the determination element for indicating to a user of the selective call receiver that the memory space therein is insufficient to receive any additional messages.

* * * * *